US010703661B2

(12) United States Patent
 Abusultan et al.

(10) Patent No.: US 10,703,661 B2
(45) Date of Patent: Jul. 7, 2020

(54) METHOD FOR PURIFYING WATER AS WELL AS PLANT SUITABLE FOR SAID METHOD

(71) Applicant: Oasen N.V., Gouda (NL)

(72) Inventors: Almohanad Abed Elqader Mohammed Abusultan, Gouda (NL); Walterus Gijsbertus Joseph Van der Meer, Gouda (NL)

(73) Assignee: OASEN N.V., Gouda (NL)

( * ) Notice: Subject to any disclaimer, the term of this patent is extended or adjusted under 35 U.S.C. 154(b) by 277 days.

(21) Appl. No.: 15/919,388

(22) Filed: Mar. 13, 2018

(65) Prior Publication Data
 US 2018/0265387 A1 Sep. 20, 2018

(51) Int. Cl.
 *B01D 15/00* (2006.01)
 *C02F 9/00* (2006.01)
 (Continued)

(52) U.S. Cl.
 CPC .............. *C02F 9/00* (2013.01); *B01D 15/362* (2013.01); *B01D 15/363* (2013.01);
 (Continued)

(58) Field of Classification Search
 CPC ........ B01D 15/00; B01D 15/02; B01D 15/08; B01D 15/42; B01D 15/424; B01D 37/00; B01D 41/00; B01D 41/02; B01D 61/00; B01D 61/02; B01D 61/002; B01D 61/14; B01D 61/04; B01D 61/16; B01D 61/58;
 (Continued)

(56) References Cited

U.S. PATENT DOCUMENTS 3,639,231 A * 2/1972 Bresler ................. B01D 61/04
 210/638
6,030,535 A * 2/2000 Hayashi ................ B01D 61/58
 210/652
(Continued)

FOREIGN PATENT DOCUMENTS

AU 2009200113 8/2009
EP 0249925 6/1987
(Continued)

OTHER PUBLICATIONS

European Search Report for EP 18161272, dated May 30, 2018, 9 pages.

*Primary Examiner* — Allison G Fitzsimmons
(74) *Attorney, Agent, or Firm* — Casimir Jones S.C.; Tyler Sisk

(57) ABSTRACT

The present invention relates to a method for purifying water using at least one unit for trapping one or more ions and at least one membrane filtration unit, wherein an aqueous stream is withdrawn from a source and is fed to the aforementioned unit for trapping one or more ions, wherein the aqueous stream leaving the aforementioned unit is fed to the aforementioned membrane filtration unit, and at least one concentrate stream and one permeate stream are obtained in said membrane filtration unit, wherein at least part of the aforementioned one or more ions that are trapped is added to the aforementioned permeate stream to obtain a permeate stream enriched with one or more ions.

12 Claims, 2 Drawing Sheets

Figure 1:
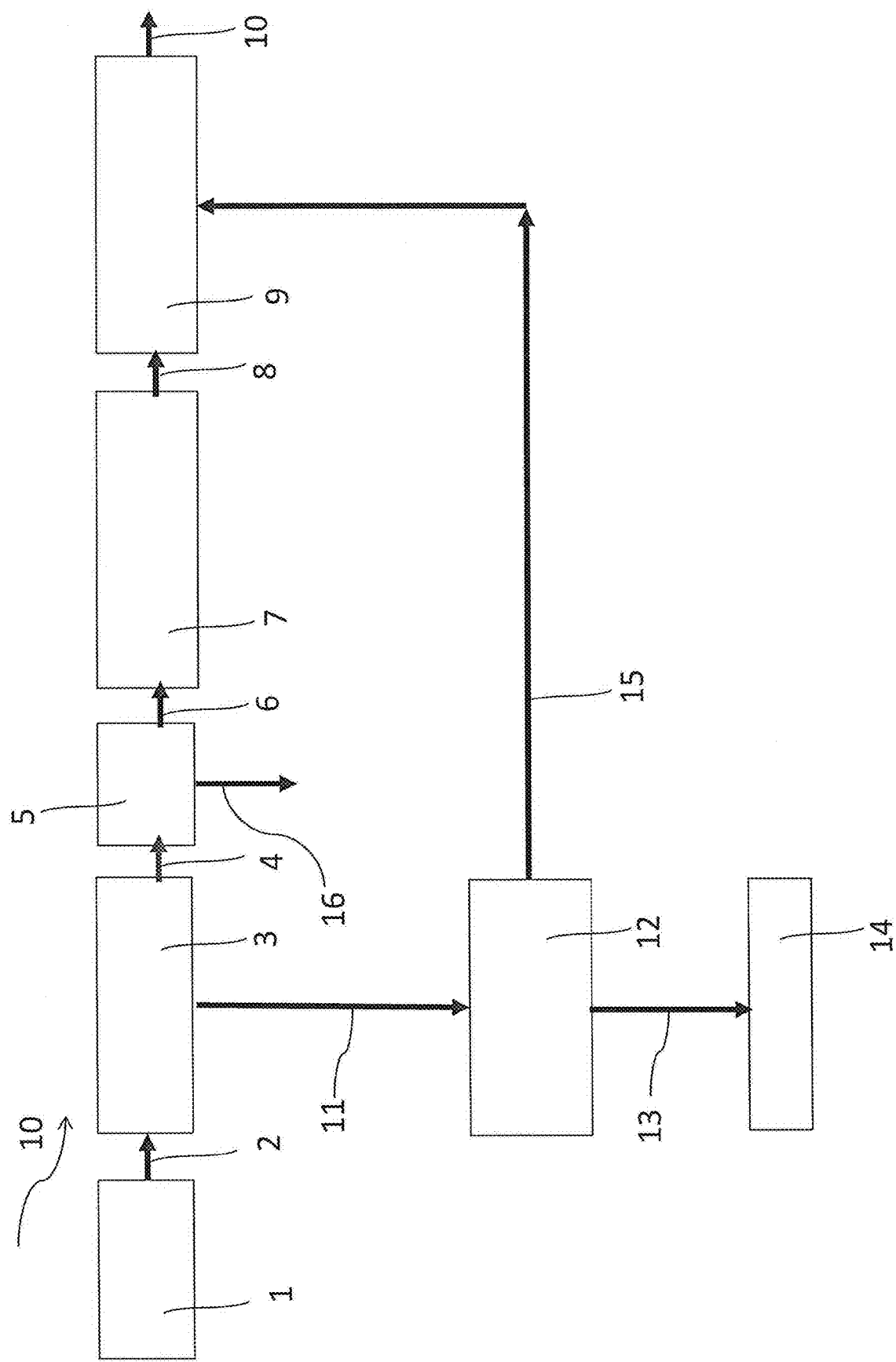

(51) Int. Cl.
*C02F 1/42* (2006.01)
*C02F 1/44* (2006.01)
*C02F 1/68* (2006.01)
*B01D 15/36* (2006.01)
*B01D 61/02* (2006.01)
*B01D 61/04* (2006.01)
*B01D 61/44* (2006.01)
*C02F 1/00* (2006.01)
*C02F 1/469* (2006.01)
*C02F 1/461* (2006.01)
*C02F 1/52* (2006.01)
*C02F 101/10* (2006.01)
*C02F 103/00* (2006.01)

(52) U.S. Cl.
CPC ........... *B01D 61/025* (2013.01); *B01D 61/04* (2013.01); *B01D 61/445* (2013.01); *C02F 1/42* (2013.01); *C02F 1/441* (2013.01); *C02F 1/68* (2013.01); *B01D 2311/04* (2013.01); *B01D 2311/06* (2013.01); *B01D 2311/2623* (2013.01); *B01D 2311/2642* (2013.01); *C02F 1/4618* (2013.01); *C02F 1/4693* (2013.01); *C02F 1/5236* (2013.01); *C02F 2001/422* (2013.01); *C02F 2001/425* (2013.01); *C02F 2101/105* (2013.01); *C02F 2103/007* (2013.01); *C02F 2303/02* (2013.01); *C02F 2303/16* (2013.01)

(58) Field of Classification Search
CPC ............ B01D 2215/00; B01D 2215/02; B01D 2221/02; B01D 2221/12; B01D 2321/00; B01D 2321/14; C02F 1/00; C02F 1/001; C02F 1/42; C02F 1/441; C02F 1/442; C02F 1/44; C02F 2001/422; C02F 2001/425; C02F 2001/427; C02F 5/00; C02F 2303/22
USPC ....... 210/660, 661, 670, 672, 677, 678, 681, 210/683, 685, 687, 767, 790, 791, 792, 210/793, 806, 807
See application file for complete search history.

(56) References Cited

U.S. PATENT DOCUMENTS

| | | |
|---|---|---|
| 2010/0294717 A1 | 11/2010 | Lahav et al. |
| 2012/0080376 A1* | 4/2012 | Komor ............... B01J 39/05 210/638 |
| 2013/0126353 A1 | 5/2013 | Perez et al. |

FOREIGN PATENT DOCUMENTS

| | | |
|---|---|---|
| WO | WO 2010/131251 | 11/2010 |
| WO | WO 2011/139984 | 11/2011 |
| WO | WO 2017/030941 | 2/2017 |

* cited by examiner

METHOD FOR PURIFYING WATER AS WELL AS PLANT SUITABLE FOR SAID METHOD

The present invention relates to a method for purifying water using at least one unit for trapping one or more ions and a membrane filtration unit, wherein an aqueous stream is withdrawn from a source and is fed to the aforementioned unit for trapping one or more ions, wherein the aqueous stream leaving the aforementioned unit is fed to the aforementioned membrane filtration unit, and at least one concentrate stream and one permeate stream are obtained in said membrane filtration unit. Furthermore, the present invention relates to water purification plant using at least one unit for trapping one or more ions and a membrane filtration unit further comprising necessary inflow or feed and discharge or outflow lines, pumps and valves.

The first choice to be made after it is established that water is required in a certain amount, is where the water is obtained. Drinking water companies have already been carefully selecting their sources for years, so that drinking water of good quality can be produced at reasonable cost. They also manage their sources in such a way that they can also be used in the future. An example of this is the filtering of water in the dunes because the groundwater here would otherwise become brackish because more fresh water is withdrawn from it than is supplemented naturally.

Discharge of salty residual streams is usually only possible if the quality of the receiving water is not impaired by the discharge. This means in principle that both the concentration and the pollutants loading in a salty residual stream should be compared with the amount and concentration of the same substances in the receiving water. It is clear from practical experience that in particular the relatively high concentration of salts in concentrate is immediately a problem for discharge. For the discharge of NF/RO concentrate (80% recovery), on account of the relatively large volume of the residual stream it is important that a suitable receiving medium (e.g. the sea or a river) is available within a reasonable distance. Furthermore, the composition and the amount of the concentrate should be such that no significant impairment of the quality of the receiving water occurs. The discharge of residual streams that are saltier than NF/RO concentrate (80% recovery) into inland surface water is not permitted on account of the relatively high salt concentration.

For NF/RO processes, it is known that a cation exchanger is employed as pretreatment, wherein ions such as $Ca^{2+}$, $Ba^{2+}$, $Mg^{2+}$, $Sr^{2+}$—which are often a component of scaling—are exchanged for $Na^+$ or $H^+$. Since most of the divalent cations are removed from the aqueous phase by the cation exchanger, hardly any are still present in the treated water, so scaling with these components will occur less quickly. Removal of these ions also ensures that they no longer pose a problem for discharge of the concentrate. When the cation exchanger is employed as pretreatment for NF/RO, there is admittedly an extra salty waste stream alongside the NF/RO concentrate: the spent regenerate. Generally speaking, this stream is much smaller in volume than the concentrate, but contains a higher concentration of salts. Discharge of spent regenerate into fresh (surface) water is undesirable.

The aforementioned Reverse Osmosis (RO) is a purification technique that is applied in the treatment of surface water to drinking water, demiwater or process water. The use of surface water requires some preliminary purification to prevent fouling of the membranes of the RO plant through scaling, particles and biomass growth. Post-treatment of the RO permeate is also generally necessary. In the production of demiwater, this post-treatment often consists of extensive removal of residual salt using ion exchange techniques. In the preparation of drinking water by RO, conditioning/recarbonation (e.g. with marble filtration or addition of milk of lime/$CO_2$) is always necessary and extra treatment is desirable to remove any remaining organic micropollutants (activated carbon filtration) and pathogenic bacteria and viruses (UV disinfection, addition of chlorine dioxide, etc.). A disadvantage of RO membranes is that in the treatment of surface water they may be subject to considerable fouling. Owing to the nutrients present in surface water (phosphate, nitrate/ammonium, dissolved organic carbon), and because surface water also contains dissolved oxygen, biomass growth quickly takes place in the membranes, so that the feed spacers of the RO membranes may become clogged. This biomass growth in membranes is also known as biofouling.

For the preparation of drinking water, demiwater or process water, the use of surface water has an advantage over groundwater. In particular, the groundwater level is not lowered on withdrawal of surface water, and so will not cause drought. Therefore a permit for withdrawal of surface water is generally more easily granted than a permit for withdrawal of groundwater.

WO 2017/030941 relates to systems and methods in which an aqueous stream comprising solubilized monovalent ions and solubilized multivalent ions is processed such that solubilized multivalent ions are selectively retained and solubilized monovalent ions are selectively removed. It has been recognized that injecting a stream of water having a relatively high concentration of solubilized multivalent ions (e.g., divalent ions) and a relatively low concentration of solubilized monovalent ions may advantageously enhance recovery of oil from an oil reservoir, in which method oil is extracted from oil reservoirs, so called waterflooding, which method involves injecting a stream of water into an oil reservoir to displace oil from the pores of porous rocks in the reservoir.

U.S. 2013/126353 relates to a water treatment system comprising: an ion exchange device adapted to receive a feed water to be treated and to produce a multi-valent cation depleted solution, an electrodialysis device adapted to receive the multi-valent cation depleted solution and to produce a desalinated effluent and a salt-concentrated solution, a bipolar electrodialysis device adapted to receive the salt-concentrated solution and to produce a regenerating solution; and, an ion exchange regeneration system adapted to flow the regenerating solution through the ion exchange device. According to such a water treatment system the ion exchange unit removes divalent cations from the feed water to the electrodialysis device, the concentration of divalent cations in the salt-concentrated solution and electrode chambers within the electrodialysis (ED) device is also reduced, wherein scaling which is primarily caused by divalent cations is reduced.

AU 2009/200113 relates to a process for producing potable water, said process comprising treating secondary and/or tertiary treated sewage using a first treatment process to generate a purified liquid; and treating the purified liquid using reverse osmosis to provide the potable water, wherein the step of treating the purified liquid using reverse osmosis further comprises disinfecting a permeate from said reverse osmosis to provide the potable water, or wherein the step of treating the purified liquid using reverse osmosis further comprises producing a permeate, disinfecting the permeate from said reverse osmosis to produce a disinfected permeate and remineralising the disinfected permeate to provide the potable water.

EP 0249 925 relates to a method for generating an acid solution and a base solution by electrodialysis of a salt solution, comprising: continuously circulating a mineral-containing salt solution through an electrodialysis stack means to produce a partially demineralized salt solution, an acid solution and a base solution, directing the acid solution to an acid receiving tank, directing the base solution to a base receiving tank, directing the partially demineralized salt solution from the electrodialysis stack means into the circulating mineral-containing salt solution, monitoring the salt concentration of the circulating mineral-containing salt solution, directing a portion of the circulating mineral-containing salt solution through a salt tank containing a saturated salt solution when the salt concentration of the circulating mineral-containing salt solution drops below a predetermined level; and directing the solution from the salt tank into the circulating mineral-containing salt solution to increase the salt concentration thereof.

None of the above discussed documents refers to a method for purifying water, wherein a concentrate stream is obtained that can be reused in the preparation of drinking water, in particular by implementing an almost closed-loop recycling.

None of the above discussed documents includes a water treatment system comprising an unit for trapping one or more ions and a membrane filtration unit, wherein the aqueous stream leaving the unit for trapping one or more ions is fed to the membrane filtration unit, and at least one concentrate stream and one permeate stream are obtained in the membrane filtration unit, wherein a concentrate stream is obtained that can be reused in the preparation of drinking water that originates from the raw aqueous material.

One aspect of the present invention is to provide a method for purifying water, wherein any formation of precipitate of lime at the end user is kept to a minimum.

A further aspect of the present invention is to provide a sustainable method for purifying water, wherein the use of chemicals is kept to a minimum.

A further aspect of the present invention is to provide a sustainable method for purifying water, wherein one or more residual streams with an enriched content of ions are obtained from the aqueous stream to be purified, and these residual streams can be reused beneficially.

Yet another aspect of the present invention is to provide a method for purifying water, wherein a concentrate stream is obtained that can be reused beneficially in the preparation of drinking water, in particular by implementing an almost closed-loop recycling.

Yet another aspect of the present invention is to provide a method for purifying water, wherein the addition of additives not originating from water, i.e. water foreign substances, to the permeate stream obtained in said method is kept to a minimum, in particular to zero.

The present invention thus relates to a method for purifying water using at least one unit for trapping one or more ions and at least one membrane filtration unit, wherein an aqueous stream is withdrawn from a source and is fed to the aforementioned unit for trapping one or more ions, wherein the aqueous stream leaving the aforementioned unit is fed to said at least one membrane filtration unit, and at least one concentrate stream and at least one permeate stream are obtained in said at least one membrane filtration unit, characterized in that at least part of the aforementioned one or more ions that are trapped is added to the aforementioned permeate stream to obtain a permeate stream enriched with one or more ions.

One or more of the aforementioned aspects is achieved using the aforementioned method. The present invention makes it possible for the aqueous stream that is to be purified to be stripped of one or more ions first, after which the ions thus trapped are reused in the purification process. The term "stripped of one or more ions" means here the removal of one or more ions. In addition, with such an operating procedure it is possible to operate the membrane filtration unit at high recovery, so that only a small volume of concentrate stream is obtained. In membrane filtration applied according to the prior art, usually a recovery of 70-80% is applied, whereas in the present method a recovery of 98% is possible. If a feed stream of 400 $m^3$/hour is being purified, then at a recovery of 70-80% applied according to the prior art, a permeate stream of 280-320 $m^3$/hour and a concentrate stream of 120-80 $m^3$/hour are obtained. In the present method, with a feed stream like this, a permeate stream of 392 $m^3$/hour and a concentrate stream of 8 $m^3$/hour are obtained. Thus, a far lower concentrate stream is obtained with the method according to the present invention.

The concentrate stream obtained with the aforementioned membrane filtration unit can be reused beneficially according to the present method, in particular by feeding the concentrate stream to a unit in which a basic stream and an acid stream are generated. As well as a high NaCl concentration, the concentrate stream generally also contains dissolved $CO_2$. Now, by feeding the concentrate stream to a bipolar membrane electrodialysis (BMED) unit, a basic stream, mainly comprising $NaHCO_3$, and an acid stream, mainly comprising HCl, are obtained.

The present inventors found that the unit for trapping one or more ions, to which the aqueous stream to be purified is fed, will in the course of time become saturated with the trapped ions. It is therefore desirable for a so-called regeneration step of the aforementioned unit for trapping one or more ions to take place. In one embodiment, such a regeneration step is implemented by feeding the aforementioned acid stream to the unit for trapping one or more ions. In said regeneration step, the previously trapped ions, in particular Ca and Mg, are brought into contact with the aforementioned acid stream, mainly comprising HCl, resulting in an aqueous stream that comprises $CaCl_2$ and $MgCl_2$. The resultant aqueous stream, mainly comprising $CaCl_2$ and $MgCl_2$, is led, in one embodiment, to another unit for trapping one or more ions, in particular an anion exchanger. In said unit, the $CaCl_2$ and $MgCl_2$ present in the aqueous stream are converted to $Ca(HCO_3)_2$ and $Mg(HCO_3)_2$. In one embodiment, this last-mentioned aqueous stream is added to the aforementioned permeate stream to obtain a permeate stream enriched with one or more ions. The result is a more or less closed loop wherein the concentrate stream is used beneficially to feed the previously trapped ions back into the permeate stream.

The other unit for trapping one or more ions, in particular an anion exchanger, should in the course of time also undergo a regeneration step, wherein in particular the aforementioned basic stream can be used. Thus, it is desirable that in said regeneration step, the basic stream is fed to the aforementioned other unit for trapping one or more ions.

The aqueous stream obtained in the aforementioned regeneration step is in particular sent for example to a wastewater treatment plant.

In practice, the aforementioned regeneration steps will be carried out at certain time intervals, so that it is desirable for the aforementioned basic stream and acid stream to be stored, for example in a buffer tank. Then the intended regeneration steps can be carried out at any desired moment.

The following may be mentioned as suitable units for trapping one or more ions: ion exchangers, zeolites, application of an operation selected from crystallization, precipitation, membrane filtration and electrodialysis.

In an embodiment of the present method, it is possible for the water to be purified to be submitted to one or more pretreatments, selected from the group of screening, lime slurry softening, sand filtration, microfiltration, ultrafiltration and activated carbon filtration, or one or more combinations thereof. The application of a screen or sieve, also to be understood as mechanical separation, has the purpose of removing coarse particles and algae (>25 μm). The application of a sludge reactor has in particular the purpose of removing Ca, solid substances (SS), $SiO_2$, $PO_4$, mussels and in addition provides some disinfection (pH >10.5). Sand filtration, microfiltration and/or ultrafiltration are employed in particular for removing constituents that cause turbidity. For removing dissolved $CO_2$ gas it is desirable for so-called tower aeration to be carried out. Activated carbon filtration is applied in a pretreatment for reducing the content of biofilm-forming constituents and dissolved organic carbon.

From the viewpoint of stability and capacity, in particular embodiments it is preferable to use an ion exchanger as the unit for trapping one or more ions. Said ion exchanger may comprise one or more ion exchangers, connected in series or in parallel. A parallel arrangement offers the possibility of implementing continuous operation, wherein one unit undergoes regeneration, while another unit is "on stream". A parallel arrangement also offers the possibility of carrying out maintenance on the plant without interrupting production.

In the particular embodiment in which the ion exchanger is used, the ions present in the aqueous stream to be treated, such as $Ca^{2+}$, $Ba^{2+}$, $Mg^{2+}$, $Sr^{2+}$, will be exchanged for $Na^+$ or $H^+$.

In an embodiment, the aforementioned ion exchanger is stripped of the trapped ions, in particular by rinsing the ion exchanger with an eluting agent. Thus the trapped ions are removed from the ion exchanger and appear in the eluting agent. The ions trapped by the ion exchanger will be taken up by the eluting agent, thus obtaining an eluent that is enriched with one or more ions. In particular embodiments it is additionally desirable for the pH and/or temperature to be varied. There are also embodiments in which use is made of non-aqueous substances, in particular organic liquids, namely alcohols, for example methanol.

Now, to increase the concentration of ions in the eluent, in an embodiment it is preferable for the eluent to undergo a fractionation treatment, wherein a product stream is obtained that has a content of ions higher than the original eluent. A product stream enriched with ions is thus obtained.

The aforementioned fractionation treatment is preferably selected from the group of eutectic freezing, nanofiltration (NF) and gradient elution, or a combination thereof. In particular embodiments, zeolites and processes of the crystallization, precipitation and electrodialysis type may also be mentioned as suitable fractionation treatments.

In eutectic freezing, use is made of lowering the temperature until specific salts crystallize out at their eutectic freezing point. Different salts in water have different eutectic freezing points, which are characterized by a temperature and a salt concentration. When the eutectic freezing point is reached, as well as ice, salt also crystallizes out, ice and salt crystals being separated on the basis of density differences. In nanofiltration (NF) the aqueous stream to be treated is forced under pressure through a semipermeable membrane. The membrane works like a filter, which for example allows water through, but not the "contaminating" substances, in particular salts, but also heavy metals, bacteria and viruses that it contains. In gradient-elution solution, the liquid composition of the eluting agent is gradually varied, i.e. over time, for example by using an aqueous salt solution with a variable salt content, so that the ions taken up in the ion exchanger are "released" from the ion exchanger individually as a function of time. It is thus possible for example to obtain individual aqueous streams, for example an aqueous stream rich in $Ca^{2+}$, an aqueous stream rich in $Mg^{2+}$, an aqueous stream rich in Fe etc., trapped separately and reproducibly from e.g. 100% water to 100% ethanol in a specified time. It is thus possible, with the desired fractionation treatment, to obtain a number of partial streams that can be reused beneficially. Partial streams that may be mentioned are $NH_4$, heavy metals, positively charged organic micropollutants, organic components and positively charged inorganic components/complexes.

The following may be mentioned as examples of the one or more ions in the present application: Ca, Mg, Fe, Mn and $NH_4$. In addition, however, we may also mention other positively charged ions and substances, for example positively charged organic/inorganic components that are present in the aqueous stream to be purified.

If the present method is applied for preparing drinking water, it is desirable that at least one product stream enriched with Ca and Mg is added to the aforementioned permeate stream to obtain a permeate stream enriched with Ca and Mg. In an embodiment of this kind, a certain amount of Ca and Mg ions is added to the permeate stream obtained from membrane filtration. Because no precipitate is present in the resultant product stream enriched with Ca and Mg, the permeate stream obtained after "blending", designated here as the permeate stream enriched with Ca and Mg, will also not display any precipitation. Therefore the end user will not experience any lime problems. Moreover, no water foreign substances are added to the permeate stream. Now, the product stream enriched with Ca and Mg is obtained from the original water to be purified. Thus, it may be said to be a natural source of ions, namely the original water to be purified.

If the present method is applied for another type of end user, not requiring water of drinking water quality, it is possible for a product stream with some other composition to be used, for example a product stream with an increased Fe content.

In an embodiment it is possible for the aforementioned permeate stream and/or the aforementioned permeate stream enriched with one or more ions to undergo one or more post-treatment steps, selected from the group of adjusting the buffer capacity, adjusting the acidity (pH) and adjusting the saturation index (SI). For drinking water for example, in the Water Supply Decree the quality requirements are divided into microbiological parameters, chemical parameters and various indicators, including technical operating parameters, organoleptic/aesthetic parameters and signalling parameters. Thus, depending on the requirements and legal specifications, one or more post-treatment steps are carried out in particular embodiments. In post-treatment, activated carbon filtration is generally employed for removing remaining organic microconstituents. It is, however, also possible to include addition of milk of lime as a post-treatment step after the membrane filtration unit, and there may also be UV treatment, in particular to provide disinfection. In an embodiment it is also desirable in addition to increase the hardness of the resultant purified water, in particular by adding chemical constituents, or blending with other water streams.

The permeate stream enriched with one or more ions obtained with the present method is fed to one or more consumer units, wherein the consumer units are in particular connected together via a central pipeline network, and the aforementioned permeate stream enriched with one or more ions is fed to this central pipeline network. The one or more consumer units are in particular connected via one or more branch pipelines to the aforementioned central pipeline network.

The following may be mentioned as examples of water to be fed to at least one membrane filtration unit: surface water, groundwater, brackish groundwater, natural groundwater, infiltrated surface water, infiltrated seawater, infiltrated effluent from sewage treatment, bank-filtered water, wastewater, effluent from wastewater treatment, seawater and process water, or a combination thereof.

The membrane filtration unit to be used in the present invention is preferably assembled from one or more membranes of the reverse osmosis type.

The membrane filtration unit stated in the present application may be assembled from one or more membranes of the microfiltration, ultrafiltration, nanofiltration and reverse osmosis type, wherein membranes of the tubular, sheet-like and spiral-wound type may be used.

The membrane filtration unit comprises membranes connected in series, membranes connected in parallel, or a combination thereof.

The following may be mentioned as examples of consumer units: properties, especially households, business premises and industrial locations, but also hospitals and health care institutions. These last-mentioned consumer units have a particular need for water that is free from viruses and bacteria, and this type of water can be prepared with the present invention.

The present invention further relates to water purification plant using at least one unit for trapping one or more ions and a membrane filtration unit, further comprising necessary inflow and outflow lines, pumps and valves, wherein an aqueous stream is withdrawn from a source and is fed to the aforementioned unit for trapping one or more ions, wherein the aqueous stream leaving the aforementioned unit for trapping one or more ions is fed to the aforementioned membrane filtration unit, and at least one concentrate stream and at least one permeate stream are obtained in said membrane filtration unit, characterized in that the aforementioned plant further comprises means for stripping one or more trapped ions from the aforementioned unit for trapping one or more ions and means for adding the thus stripped one or more ions to the aforementioned permeate stream to obtain a permeate stream enriched with one or more ions.

The following may be mentioned as the aforementioned unit for trapping one or more ions: ion exchangers, zeolites, crystallization unit, precipitation unit, membrane filtration and electrodialysis, preferably an ion exchanger. In one embodiment, the aforementioned unit for trapping one or more ions comprises a cation exchanger.

In one embodiment, the present plant further comprises a unit for generating a basic stream and an acid stream, said unit further comprising a pipeline for feeding the aforementioned acid stream to the aforementioned cation exchanger, and a pipeline for carrying away the aforementioned acid stream from the aforementioned cation exchanger.

In one embodiment, the aforementioned cation exchanger comprises a discharge pipe, said discharge pipe being connected to another unit for trapping one or more ions, in particular an anion exchanger.

In one embodiment, the aforementioned anion exchanger is provided with a feed pipe, and the aforementioned basic stream is fed to the aforementioned anion exchanger via said feed pipe.

In one embodiment, the aforementioned anion exchanger comprises a pipeline, said pipeline being connected to a pipeline for the permeate stream.

In one embodiment, the aforementioned plant comprises one or more buffer tanks for the temporary storage of one or more streams, in particular the aforementioned basic stream, acid stream and effluent stream from the aforementioned anion exchanger.

In one embodiment, the unit for trapping one or more ions is connected to means for stripping one or more ions from the aforementioned unit, wherein the aforementioned means for stripping one or more ions in particular are connected to fractionating means, said fractionating means in particular being connected to the aforementioned permeate stream to obtain a permeate stream enriched with one or more ions.

The aforementioned fractionating means are selected from means for carrying out eutectic freezing, nanofiltration (NF) and gradient elution, or a combination thereof. In particular embodiments, zeolites, crystallization unit, precipitation unit, membrane filtration and electrodialysis may also be mentioned.

The invention further relates to the use of a stream withdrawn from water to be purified and enriched with one or more ions, namely for preparing drinking water, said drinking water being obtained from the aforementioned water to be purified.

Another use of the stream withdrawn from water to be purified and enriched with one or more ions is as soil improver.

In the case of a stream enriched with Fe, it is necessary to consider the use of phosphate precipitation in for example wastewater treatments and odour control in wastewater treatments by binding $H_2S$.

The stream enriched with Ca and/or Mg may also be used as a source of Ca and/or Mg in the food industry and other industries, in particular the paper industry, where Ca and/or Mg are used.

Figure 2:
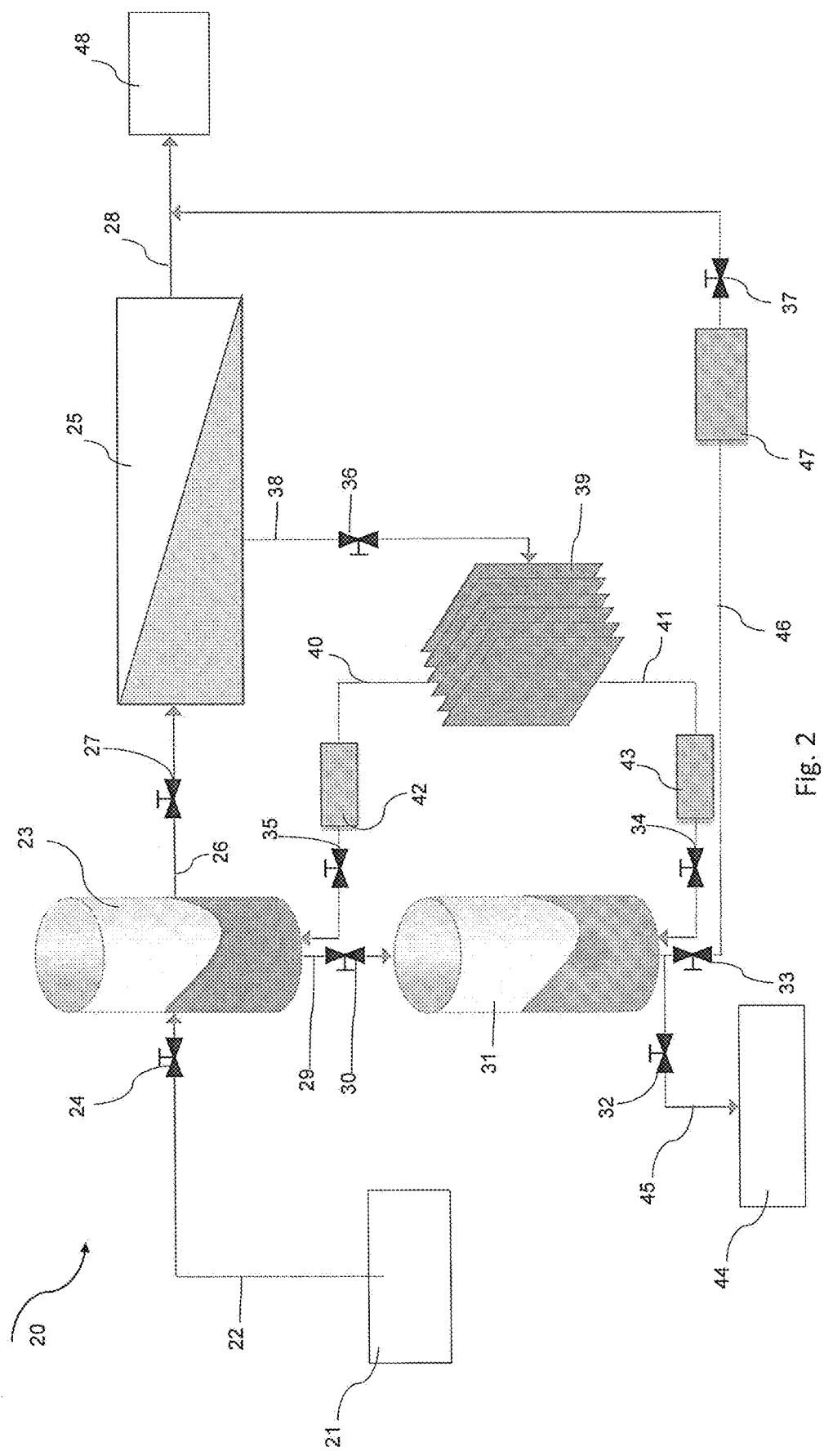

The accompanying FIGS. 1 and 2 show a schematic representation of a plant according to the present invention. For clarity, measurement and control systems, pumps and valves have been omitted, as an expert in this field will easily discern the position of the aforementioned units in the diagrams.

In FIG. 1, plant 10 for purifying an aqueous stream comprises a source 1 of raw water, for example surface water. The raw water to be treated 2 is led to a unit 3 for trapping one or more ions, for example a cation exchanger. The aqueous stream 4 leaving unit 3 during operation, which is thus stripped of one or more ions, is fed to a membrane filtration unit 5, for example a RO plant. The RO plant is operated at high recovery and a concentrate stream 16 and a permeate stream 6 are obtained. Permeate stream 6 undergoes post-treatment in unit 7 and the resultant post-treated aqueous stream 8 is fed to unit 9. After unit 3 for trapping one or more ions has been in operation for a certain length of time, a regeneration step is carried out, so that a stream 11 is obtained. Stream 11 is enriched with ions that are derived from unit 3, said ions originating in the raw water 2. In unit 12, fractionation takes place, to obtain a stream 15, and in stream 15 the content of one or more ions is higher than the content thereof in stream 11. For example, stream 15 is a stream that has a high content of Ca and/or Mg. In the fractionation in unit 12, other streams 13 are also obtained, for example streams enriched with Fe, streams enriched with $NH_4$, and streams enriched with Mn, which are suitable for various final applications 14, for example as soil improver, but also as precipitation agent for the precipitation of phosphate in for example wastewater treatment works and odour control at wastewater treatment works by binding $H_2S$. Stream 15 is mixed in unit 9 with stream 8 to obtain a permeate stream enriched with one or more ions 10. Stream 10 is supplied to end users and may undergo optional post-treatment steps (not shown).

Although in the accompanying figure we refer to a plant for preparing drinking water, it must be clear that the present invention is not limited to this. Plant 10 may also be employed for preparing other types of water, for example process water.

Moreover, it should be noted that the present invention is not limited to the application of fractionation, but that in an embodiment, the stream 11 obtained in unit 3 is added directly to for example stream 6 and/or stream 8.

Furthermore, the presence of unit 7 must be regarded as optional, because in particular embodiments the stream 6 emerging from unit 5 can be offered to end users directly, after mixing with stream 11 and/or stream 15 in unit 9.

FIG. 2 shows a schematic representation of a plant 20 according to the present invention. In plant 20, an aqueous stream to be purified 22 is withdrawn from source 21, for example anaerobic groundwater. The raw water to be treated 22 is led, via valve 24 in the open position, to a unit 23 for trapping one or more ions, for example a cation exchanger. The aqueous stream 26 leaving unit 23 during operation, which is thus stripped of one or more ions, is fed to a membrane filtration unit 25, for example a RO plant. The RO plant is operated at high recovery and a concentrate stream 38 and a permeate stream 28 are obtained. Permeate stream 28 may be submitted to one or more post-treatments (not shown). In this kind of operation, in which purified drinking water is produced, valves 24, 27 are open, whereas valves 30 and 35 remain in the closed position.

The concentrate stream 38 is fed to a unit 39, for example BMED, for generating a basic stream 41 and an acid stream 40, wherein valve 36 is thus open. Basic stream 41 is stored in tank 43 and an acid stream 40 is stored in tank 42.

After some time, saturation of trapped ions occurs in cation exchanger 23, so that a regeneration step is desirable. In regeneration mode, supply of the raw water to be treated 22 is stopped, by closing valve 24, valve 27 also being closed. Cation exchanger 23 is washed with acid stream 40, by opening valve 35. The effluent 29 obtained in this washing step is led to anion exchanger 31, with valve 30 in the open position. In anion exchanger 31, stream 29 rich in $CaCl_2$ and $MgCl_2$ is converted into stream 46, which is rich in $Ca(HCO_3)_2$ and $Mg(HCO_3)_2$. Stream 46 is stored, via valve 33 in the open position, in tank 47. Dosing from tank 47 takes place by opening valve 37, after which stream 46, which is rich in $Ca(HCO_3)_2$ and $Mg(HCO_3)_2$, is added to permeate stream 28 to obtain drinking water 48, which can be supplied to the desired end user.

After some time, a regeneration step is also desirable for anion exchanger 31, regeneration taking place by feeding basic stream 41 into anion exchanger 31. During this regeneration, valve 34 is open, and valves 33 and 30 are closed. The effluent 45 obtained in this regeneration step is sent, via valve 32 in the open position, to a wastewater treatment plant 44.

Although FIG. 2 only shows a single unit for membrane filtration unit 25, it must be clear that membrane filtration unit 25 may comprise several membrane filtration units. The same reasoning applies to anion exchanger 31, cation exchanger 23 and BMED 39. The flowsheet in FIG. 2 thus clearly shows that effective remineralization is possible, wherein the minerals already present in the water to be treated are removed and are mixed again, in the desired amount, with the treated water. The addition of a unit for generating a basic stream and an acid stream, for example BMED, and the other unit for trapping ions, the anion exchanger, mean that it is possible for both units for trapping ions, namely the cation exchanger and the anion exchanger, to be submitted to a regeneration step in an advantageous manner, the necessary chemicals for said regeneration steps being generated in the process itself. Extra dosage of chemicals thus becomes unnecessary. In addition, minerals previously removed from the water to be treated are used for remineralizing the permeate stream.

The invention claimed is:

1. A method for purifying water using at least one unit for trapping one or more ions and at least one membrane filtration unit,
    wherein an aqueous stream is withdrawn from a source and is fed to the unit for trapping one or more ions, the aqueous stream leaving the unit for trapping one or more ions is fed to the membrane filtration unit, at least one concentrate stream and one permeate stream are obtained in said membrane filtration unit, wherein at least part of the one or more ions that are trapped is added to the permeate stream to obtain a permeate stream enriched with one or more ions and the concentrate stream is fed to a unit for generating a basic stream and an acid stream, said unit performs bipolar membrane electrodialysis,
    the acid stream is applied in a regeneration step of the unit for trapping one or more ions, an effluent stream obtained in the regeneration step is fed to a second unit for trapping one or more ions, wherein at least part of the effluent stream obtained from the second unit for trapping one or more ions is fed to the permeate stream, wherein the effluent stream is stored and is fed to the permeate stream,
    said second unit for trapping one or more ions performs a regeneration step, and in said regeneration step the basic stream is fed to the second unit for trapping one or more ions.

2. The method according to claim 1, wherein the aqueous stream obtained in the regeneration step is led away.

3. The method according to claim 1, wherein the basic stream and acid stream are stored.

4. The method according to claim 1, wherein the units for trapping one or more ions comprise ion exchangers or zeolites, and within which an operation selected from the group consisting of crystallization, precipitation, membrane filtration, electrodialysis, or a combination thereof is performed, and wherein the unit for trapping one or more ions to which the aqueous stream derived from a source is fed comprises a cationic ion exchanger.

5. The method according to claim 4, wherein the second unit for trapping one or more ions, to which unit the basic stream is fed in the regeneration step, comprises an anion exchanger.

6. The method according to claim 1, wherein the one or more ions are selected from the group consisting of Ca, Mg, Fe, Mn and $NH_4$.

7. The method according to claim 1, wherein at least one aqueous stream enriched with Ca and Mg is added to the permeate stream to obtain a permeate stream enriched with Ca and Mg.

8. The method according to claim 7, wherein the permeate stream and/or the permeate stream enriched with one or more ions undergo one or more post-treatment steps selected from the group consisting of adjusting the buffer capacity, adjusting the acidity (pH) and adjusting the saturation index (SI).

9. The method according to claim 5, wherein the unit for trapping one or more ions comprises treatment with an eluting agent, wherein an eluent obtained with the treatment is enriched with one or more ions, wherein the eluent is submitted to a fractionation treatment to obtain one or more product streams enriched with ions, wherein the fractionation treatment is selected from the group consisting of eutectic freezing, nanofiltration (NF), gradient elution, zeolites and processes of crystallization, precipitation, electrodialysis, or a combination thereof.

10. The method according to claim 7, wherein the permeate stream enriched with one or more ions is fed to one or more consumer units connected together via a central pipeline network, wherein the consumer units are fed with the permeate stream enriched with one or more ions, wherein the one or more consumer units are connected via one or more branch pipelines to the central pipeline network, wherein the consumer units are selected from the group consisting of households, businesses, and industrial locations.

11. The method according to claim 1, wherein the water to be fed to at least one membrane filtration unit is derived from a source selected from the group consisting of surface water, groundwater, brackish groundwater, natural groundwater, infiltrated surface water, infiltrated seawater, infiltrated sewage treatment effluent, bank-filtered water, wastewater, effluent from wastewater treatment, seawater, process water, or a combination thereof.

12. The method according to claim 1, wherein the at least one membrane filtration unit is assembled from one or more membranes of the reverse osmosis type, wherein the at least one membrane filtration unit further comprises one or more membranes of the microfiltration, ultrafiltration or nanofiltration type, wherein the membranes are connected in series, in parallel, or in an combination, wherein the membranes are tubular, sheet-like or spiral-wound.

* * * * *